United States Patent
Ponnuswamy

(10) Patent No.: US 9,332,457 B2
(45) Date of Patent: May 3, 2016

(54) METHOD AND SYSTEM FOR USING A MINIMUM SENSITIVITY THRESHOLD FOR RECEIVING WIRELESS SIGNALS

(71) Applicant: Aruba Networks, Inc., Sunnyvale, CA (US)

(72) Inventor: Subburajan Ponnuswamy, Cupertino, CA (US)

(73) Assignee: ARUBA NETWORKS, INC., Sunnyvale, CA (US)

( * ) Notice: Subject to any disclaimer, the term of this patent is extended or adjusted under 35 U.S.C. 154(b) by 0 days.

(21) Appl. No.: 14/536,931

(22) Filed: Nov. 10, 2014

(65) Prior Publication Data

US 2015/0133063 A1     May 14, 2015

Related U.S. Application Data

(63) Continuation of application No. 13/563,549, filed on Jul. 31, 2012, now Pat. No. 8,886,236.

(51) Int. Cl.
| | |
|---|---|
| *H04B 17/00* | (2015.01) |
| *H04W 24/10* | (2009.01) |
| *H04B 17/29* | (2015.01) |
| *H04W 52/24* | (2009.01) |

(52) U.S. Cl.
CPC .............. *H04W 24/10* (2013.01); *H04B 17/29* (2015.01); *H04W 52/245* (2013.01)

(58) Field of Classification Search
CPC .... H04W 24/10; H04W 52/245; H04B 17/29; H04B 1/713
USPC ............. 455/67.13, 67.11, 63.1, 501, 115.3, 455/556.2
See application file for complete search history.

(56) References Cited

U.S. PATENT DOCUMENTS

| | | | | |
|---|---|---|---|---|
| 6,463,287 | B1 * | 10/2002 | Wegner ..................... | 455/456.1 |
| 7,082,301 | B2 * | 7/2006 | Jagadeesan et al. .......... | 455/436 |
| 7,366,202 | B2 * | 4/2008 | Scherzer et al. ............. | 370/480 |
| 7,515,909 | B2 * | 4/2009 | Jain ..................... | H04L 43/0829 |
| | | | | 455/436 |
| 7,602,791 | B1 * | 10/2009 | Jiang et al. ............... | 370/395.41 |
| 7,633,901 | B2 * | 12/2009 | Yuen et al. ................. | 370/329 |
| 7,751,377 | B2 * | 7/2010 | Yang et al. ................ | 370/338 |
| 7,769,050 | B2 * | 8/2010 | Scherzer et al. ............. | 370/480 |
| 8,140,075 | B2 * | 3/2012 | Watanabe ......... | H04W 36/0011 |
| | | | | 370/328 |
| 8,315,271 | B2 * | 11/2012 | Nanda et al. .................. | 370/450 |
| 8,355,372 | B2 * | 1/2013 | Abraham et al. ............. | 370/329 |
| 8,401,018 | B2 * | 3/2013 | Meylan et al. .............. | 370/395.4 |
| 8,483,620 | B2 * | 7/2013 | Horn et al. ................. | 455/67.13 |
| 8,660,212 | B2 * | 2/2014 | Ponnuswamy ............... | 375/316 |
| 8,886,236 | B2 * | 11/2014 | Ponnuswamy ............... | 455/501 |
| 8,897,778 | B2 * | 11/2014 | Ghosal ............. | H04W 36/0055 |
| | | | | 455/436 |
| 2005/0059400 | A1 * | 3/2005 | Jagadeesan et al. .......... | 455/436 |
| 2008/0165874 | A1 * | 7/2008 | Steele et al. .................. | 375/261 |
| 2013/0322401 | A1 * | 12/2013 | Visuri et al. .................. | 370/331 |

\* cited by examiner

*Primary Examiner* — Marceau Milord

(74) *Attorney, Agent, or Firm* — Mannava & Kang, P.C.

(57) ABSTRACT

A method includes computing a minimum sensitivity threshold value for a particular wireless device, configuring the particular wireless device to receive wireless signals with a signal strength higher than the minimum sensitivity threshold value, distributing the minimum sensitivity threshold value to other wireless devices, and configuring the other wireless devices based on the minimum sensitivity threshold value for the particular wireless device.

14 Claims, 3 Drawing Sheets

METHOD AND SYSTEM FOR USING A MINIMUM SENSITIVITY THRESHOLD FOR RECEIVING WIRELESS SIGNALS

PRIORITY CLAIMS

This application claims the benefit of priority on U.S. patent application Ser. No. 13/563,549, filed Jul. 31, 2012 and entitled "Method and System for Using a Minimum Sensitivity Threshold for Receiving Wireless Signals", which is incorporated herein in its entirety by reference.

TECHNICAL FIELD

The present disclosure relates to minimum sensitivity thresholds for wireless signals. In particular, the present disclosure relates to determining a minimum sensitivity threshold value, publishing a minimum sensitivity threshold value, and using a minimum sensitivity threshold value.

BACKGROUND

In recent years, Wireless Local Area Network (WLAN) technologies have emerged as a fast-growing market. Among the various WLAN technologies, Institute of Electrical and Electronics Engineers (IEEE) 802.11 standard is the dominating technology and is frequently used for WLANs.

Devices within WLANs communicate wirelessly pursuant to the 802.11 standard with other devices within the WLAN to request, grant, provide, and/or receive access to network resources. However, wireless communication between a first set of devices may interfere with communication between another set of devices. In one example, a first set of devices communicating on a particular channel may cause interference for a second set of devices communicating on the same channel (or partially overlapping channels) if wireless signals, transmitted between devices in the first set of devices, reaches devices in the second set of devices.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings in which like references indicate similar elements. It should be noted that references to "an" or "one" embodiment in this disclosure are not necessarily to the same embodiment, and they mean at least one. In the drawings.

DETAILED DESCRIPTION

Figure 1:
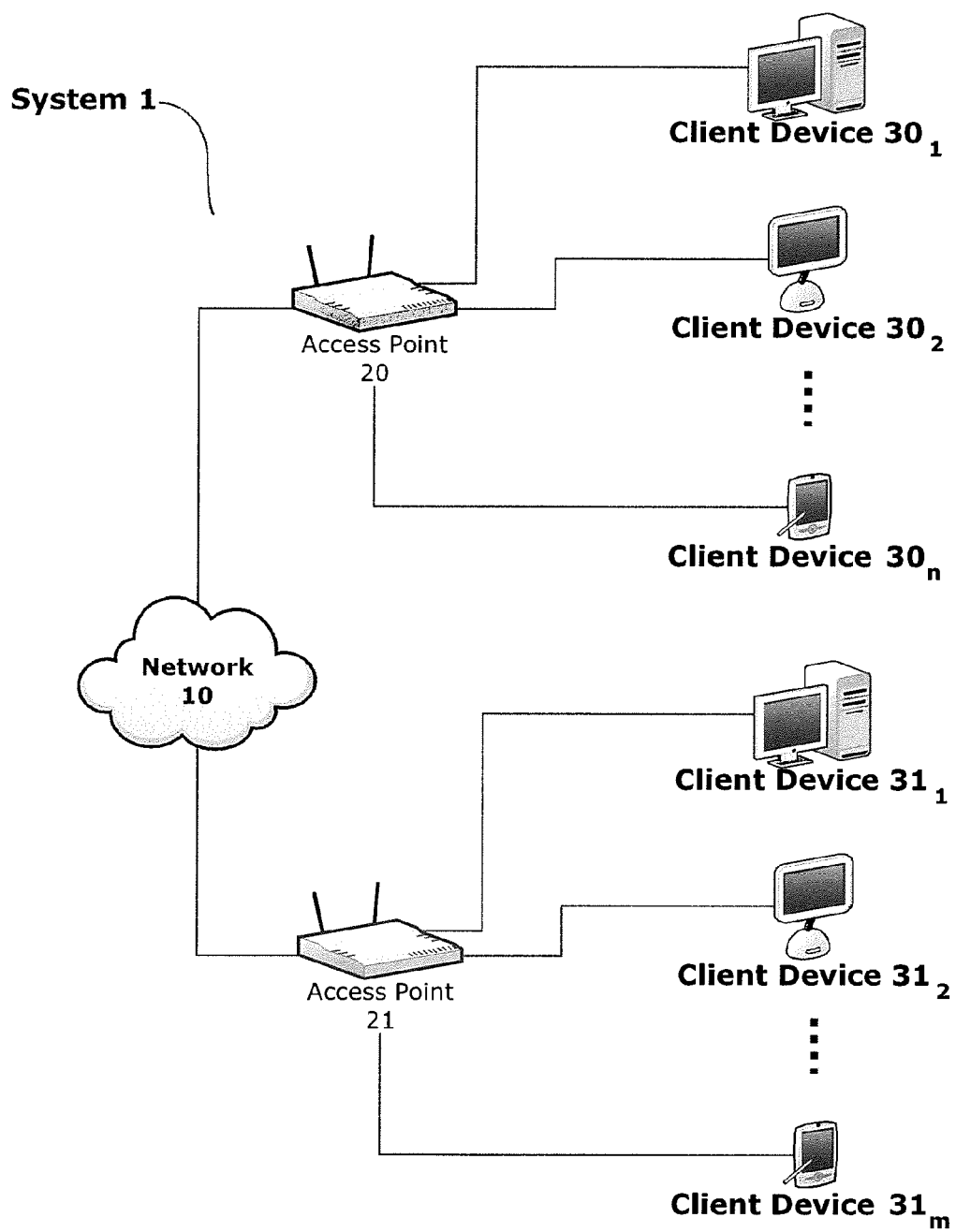
FIG. 1 shows a block diagram example of a system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention. The detailed description includes the following sections:

1. GENERAL OVERVIEW
2. ARCHITECTURAL OVERVIEW
3. COMPUTING THE MINIMUM SENSITIVITY THRESHOLD VALUE
4. PUBLISHING THE MINIMUM SENSITIVITY THRESHOLD VALUE
5. USING THE MINIMUM SENSITIVITY THRESHOLD VALUE FOR OTHER DEVICES
6. EXAMPLE EMBODIMENTS

1. General Overview

In an embodiment, a minimum sensitivity threshold value is computed dynamically for a particular wireless device based on signal strengths of one or more wireless signals received from other wireless devices and interference correlating to signal noise detected by the particular wireless device. The particular wireless device is configured to receive wireless signals with a signal strength higher than the minimum sensitivity threshold value.

In an embodiment, a minimum sensitivity threshold value that is used by a particular wireless device for determining whether to receive wireless signals, is transmitted to other wireless devices. The minimum sensitivity threshold value may be transmitted wirelessly from the particular wireless device directly to the other wireless devices.

In an embodiment, a minimum sensitivity threshold value used for configuring a particular wireless device is used to determine a minimum sensitivity threshold value for configuring other wireless devices.

In an embodiment, a minimum sensitivity threshold value used for configuring a first wireless device is used to determine a transmit power for wireless signals transmitted by a second wireless device. The transmit power may be computed such that when the wireless signal reaches the first wireless device from the second wireless device, the signal strength is higher than the minimum sensitivity threshold of the first wireless device (for example, when the first wireless device is a targeted recipient of the wireless signal). Alternatively, the transmit power may be computed such that when the wireless signal reaches the first wireless device from the second wireless device, the signal strength is lower than the minimum sensitivity threshold of the first wireless device (for example, when the first wireless device is not a targeted recipient of the wireless signal).

2. Architechtural Overview

One or more embodiments described herein are applicable for configuring a minimum sensitivity threshold value for any wireless device, or configuring parameters of any wireless device based on the minimum sensitivity threshold value used for configuring another wireless device. A wireless device includes any device that can be configured to communicate wirelessly with another wireless device. Some wireless devices may also be configured to communicate with other devices using a wired connection. The examples herein which refer to a specific type of wireless device (such as an access point or a client device) may be equally applicable to other wireless devices (such as a mesh node).

FIG. 1 shows a block diagram example of a system in accordance with one or more embodiments. System 1, as illustrated in FIG. 1, is a digital system that includes a network 10 (for example, a Local Area Network, a Wide Area Network, the Internet, Intranet, etc.) and a set of wireless devices (for example, an access point 20, a set of client devices $30_1$-$30_n$, an access point 21, and a set of client devices $30_1$-$30_m$). The access point 20 and the access point 21 are communicatively coupled to the network 10 via a transmission medium to send and receive data. The client devices may include any set of devices that communicate wirelessly with at least one of the access points within System 1. System 1 may include more or less devices, than the devices illustrated in FIG. 1, that may be connected to other devices within System 1 via wired and/or wireless segments.

In an example, System 1 may include a controller which is configured to communicate with one or more access points (for example, access point 20 and access point 21) within System 1. The controller may link access point 20 and access point 21 to network 10. In another example, access point 20 and access point 21 may be Mesh Portals or Mesh Points in a Mesh Network. In another example, System 1 may include wireless devices that are client devices in a peer-to-peer connectivity model.

In an embodiment, the client devices $30_1$-$30_n$ are digital devices that include a processor, memory hierarchy, and input/output (I/O) interfaces including a wireless interface such as an IEEE 802.11 wireless interface. The wireless interface may be used to communicate with the access point 20. The client devices $30_1$-$30_n$ may be wireless electronic devices, capable of receiving the data streams, such as personal computers, laptop computers, netbook computers, wireless music players, portable telephone communications devices, smart phones, tablets, and digital televisions.

Figure 2:
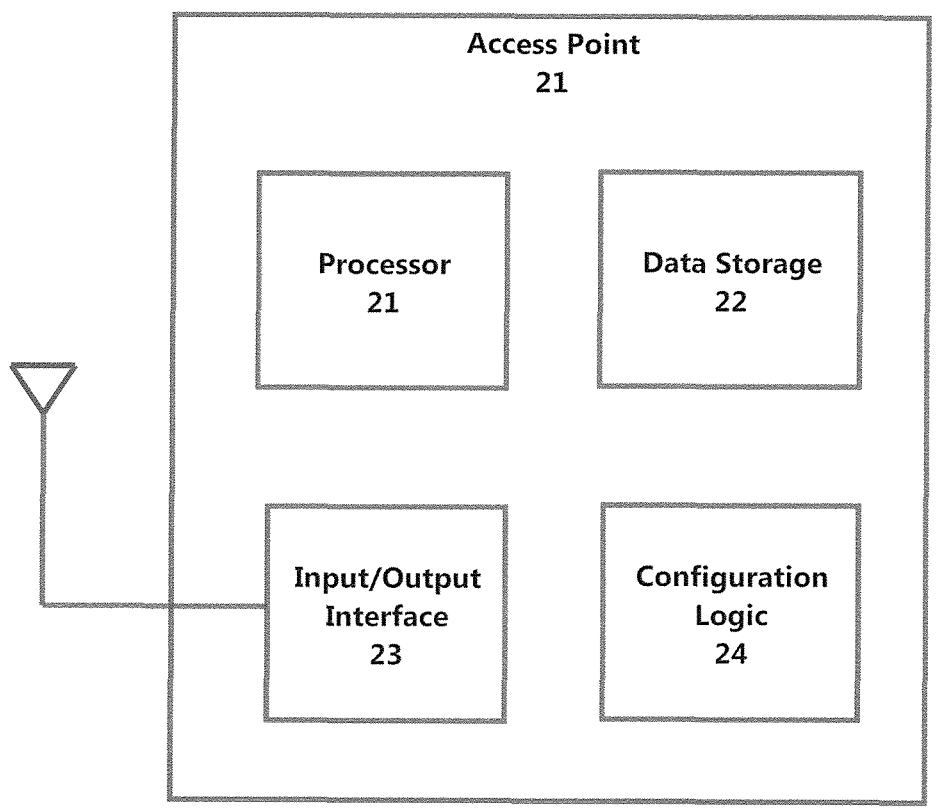
FIG. 2 shows a block diagram example of an access point 20 in accordance with one or more embodiments.

FIG. 2 shows a block diagram example of access point 21 (or access point 20) in accordance with one or more embodiments. The access point 21 is a network device that comprises one or more of: a processor 21, data storage 22, an I/O interface 23, and a device configuration logic 24. Other access points within System 1 may be configured similarly or differently than access point 21.

The data storage 22 of the access point 21 may include a fast read-write memory for storing programs and data during the access point 21's operations and a hierarchy of persistent memory such as ROM, EPROM, and Flash memory for storing instructions and data needed for the startup and/or operations of access point 21. The data storage 22 stores data that is to be transmitted from the access point 21 or data that is received by access point 21. In an embodiment, the data storage 22 is a distributed set of data storage components.

In an embodiment, the I/O interface 23 corresponds to one or more components used for communicating with other devices via wired or wireless segments. The I/O interface 23 may include a wired network interface such as an IEEE 802.3 Ethernet interface and/or a wireless interface such as an IEEE 802.11 WiFi® interface (WiFi® is a registered trademark of WiFi Alliance).

The processor 21 is coupled to the data storage 22 and the I/O interface 23. The processor 21 may be any processing device including, but not limited to a MIPS-class processor, a microprocessor, a digital signal processor, an application specific integrated circuit, a microcontroller, a state machine, or any type of programmable logic array.

In an embodiment, the device configuration logic 24 includes one or more functional units implemented using firmware, hardware, software, or a combination thereof for determining a minimum sensitivity threshold value and/or publishing the minimum sensitivity threshold value. The device configuration logic 24 of access point 21 may use a minimum sensitivity threshold value, used by access point 20, to configure the minimum sensitivity threshold value of access point 21 or to configure a transmit power of wireless signals transmitted by access point 21. A transmit power refers to the Equivalent Isotropically Radiated Power (EIRP) or Effective Isotropically Radiated Power (EIRP). The transmit power may refer to the amount of power that a theoretical isotropic antenna would emit to produce the peak power density observed in the direction of maximum antenna gain. The transmit power may be expressed in dB-microvolts (dBm) or in decibels above a reference level of one milliwatt (dBm). A wireless signal loses power as the wireless signal is transmitted from a first wireless device to a second wireless device. As a result of losing power, a wireless device receives a wireless signal at a particular signal strength that is lower than the transmit power with which the wireless signal was initially transmitted by another wireless device.

Although, the device configuration logic 24 is shown as implemented on access point 21, one or more physical or functional components of the device configuration logic 24 may be implemented on a separate device.

3. Computing the Minimum Sensitivity Threshold Value

In an example, access point 20 and access point 21 are two access points in a set of access points that are mounted inside the same office building. Each access point provides services via wireless signals to one or more clients within the office building. Furthermore, access point 20 and access point 21 use at least partially overlapping radio frequency channels for communicating with client devices $30_1$-$30_n$ and client devices $30_1$-$30_m$. Additional access points may share the same radio frequency channel (or partially overlapping radio frequency channels) with access point 20 and access point 21 and be configured as described below. However, this example refers to two access points for purposes of clarity. When wireless signals targeted for one or more of client devices $30_1$-$30_n$ are transmitted by access point 20, the wireless signals reach access point 21 and may interfere with wireless communication between access point 21 and client devices $31_1$-$31_m$. For example, when the access point 21 receives the wireless signal transmitted by access point 20, the access point 21 may determine that the radio frequency channel is busy and in response, access point 21 may delay wireless transmission of data to client devices $31_1$-$31_m$. The interference caused by signals transmitted by access point 20 (and/or other wireless devices) for access point 21 may be measured and/or analyzed to generate a corresponding interference value.

In an embodiment, interference at access point 21, due to the wireless signals transmitted by access point 20, may be reduced using a minimum sensitivity threshold value. A minimum sensitivity threshold value is a value against which signal strength of wireless signals is measured. Signal strength may refer to an absolute value of signal strength (for example, −60 dBm) or a signal-to-noise ratio (SNR) (for example, 10 dB or 20 dB). A minimum sensitivity threshold value is used by a wireless device to determine whether to receive wireless signals that are detected by the wireless device based on a signal strength of the wireless signals when received at the wireless device. A wireless device may use different SNR values for different links corresponding to respective wireless devices. As used herein, a wireless signal is "received" by a wireless device, when the wireless signal is (a) detected by an antenna of the wireless device and (b) passes through one or more device components responsive to having a signal strength higher than a minimum sensitivity threshold value. The wireless signal is not "received" by a wireless device, when the wireless signal fails to pass through one or more device components responsive to having a signal strength lower than a minimum sensitivity threshold value. Configuring a wireless device to receive a wireless signal with signal strength higher than a minimum sensitivity threshold value, as referred to herein, is defined as configuring one or more components in the wireless device such that (a) wireless signals with a signal strength higher than the minimum sensitivity threshold value pass through the one or more components and are made available for processing by the wireless device and (b) wireless signals with a signal strength lower than the minimum sensitivity threshold value do not pass through the one or more components and are not made available for processing by the wireless device.

Figure 3:
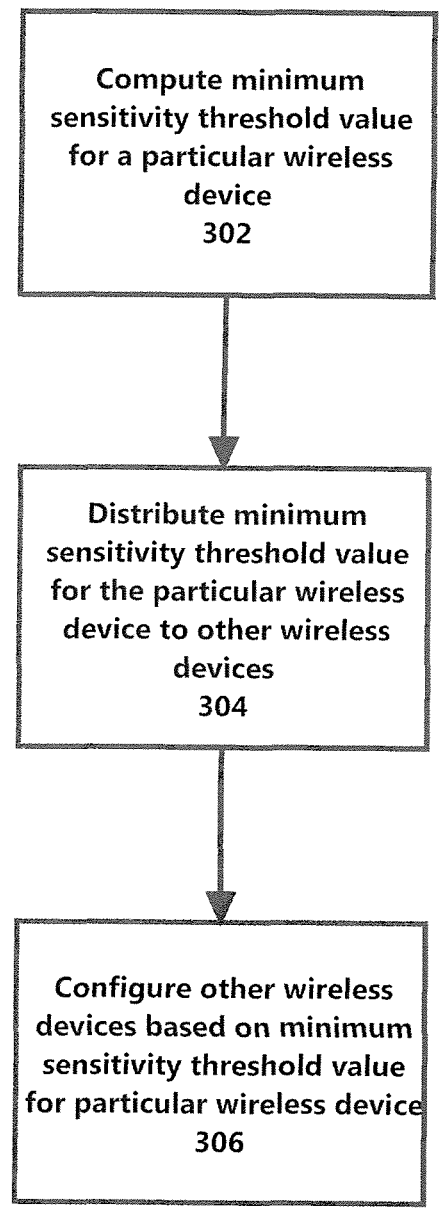
FIG. 3 illustrates an example method for configuring wireless devices in accordance with one or more embodiments.

In an embodiment, a minimum sensitivity threshold is computed for a particular wireless device (Block 302 of FIG. 3). The minimum sensitivity threshold value for a wireless device may be computed based, at least in part, on (a) a signal strength for one or more wireless signals received by the wireless device and/or (b) an interference value correlating to signal noise detected by wireless device. The interference value may be based on interference caused by Wi-Fi signals based on IEEE 802.11 standards, Wi-Fi signals not based on IEEE 802.11 standards (for example, Bluetooth), and/or non-Wi-Fi signals (for example, microwave radiation). Signal noise with respect to a wireless device, includes wireless signals that are not targeted for that wireless device. Signal noise detected by a particular wireless device is generally the result of wireless signals transmitted from wireless devices that are relatively further in distance than wireless devices in communication with the particular wireless device. In some cases environmental conditions (such as objects, walls, trucks, etc.) may affect signal strength of wireless signals received from other wireless devices.

In an example, a wireless device monitors the signal strength of detected wireless signals that are targeted for that wireless device and the signal strength of detected wireless signals that are not targeted for that wireless device. Based on the monitoring, the wireless device determines a minimum sensitivity threshold value that would be optimal for receiving wireless signals intended for that wireless device while not receiving (noise) wireless signals not intended for that wireless device.

In an embodiment, the minimum sensitivity threshold value is dynamically computed. In an example, the minimum sensitivity threshold value is computed periodically, continuously, or in response to an event. The minimum sensitivity threshold value may be computed in response to a change in (a) average signal strength for one or more wireless signals received by the wireless device in different time windows and/or (b) an interference value correlating to signal noise detected by wireless device. In an example, access point 21 detects that the average signal strength of wireless signals being received from client device 31$_1$ has decreased. In response to the decrease in the average signal strength, access point 21 may lower the minimum sensitivity threshold value to ensure that wireless signals from client device 31$_1$ are received by access point 21. In another example, access point 21 may detect that the average signal strength of wireless signals from access point 20 have increased resulting in increased interference for communication between access point 21 and client device 31$_1$. In response, the access point 21 may increase the minimum sensitivity threshold value to reduce the interference by wireless signals transmitted by access point 20. The increase or decrease in average signal strength of wireless signals detected by a wireless device may be the result of environmental changes or a change in the transmit power of the wireless signal when transmitted by an originating wireless device.

In an embodiment, dynamically computing the minimum sensitivity threshold value allows access point 21 to quickly adapt to changes in environmental conditions (for example, a truck stopping between communication between an access point and a client device). In addition, a wireless device being configured to receive wireless signals with signal strength higher than a dynamically computed minimum sensitivity threshold value helps the wireless device quickly and reliably communicate with other wireless devices.

In an embodiment, the minimum sensitivity threshold value for access point 21 may be statically configured. For example, a network administrator may configure the minimum sensitivity threshold value instead of the dynamic computation described above. In another example, once the minimum sensitivity threshold value is computed based on (a) a signal strength for one or more wireless signals received by the wireless device and/or (b) an interference value correlating to signal noise detected by wireless device, the minimum sensitivity threshold value may be maintained until reconfigured by a network administrator.

4. Publishing the Minimum Sensitivity Threshold Value

In an embodiment, the minimum sensitivity threshold value that is used to configure a particular wireless device is distributed to other wireless devices (Block 304 of FIG. 3). For example, a minimum sensitivity threshold value used for configuring access point 21, as described above, may be distributed to access point 20, client devices 31$_1$-31$_m$, and/or client devices 30$_1$-30$_n$. The minimum sensitivity threshold value for the particular wireless device may be distributed to other wireless devices within a wireless range of the particular wireless devices so that the other wireless devices may be configured based on the minimum sensitivity threshold value for the particular wireless device. The configuration of the other wireless devices is described below in section 5.

In an embodiment, a minimum sensitivity threshold value may be transmitted in an IEEE 802.11 management frame (for example, authentication, deauthentication, association response, reassociation, reassociation response, disassociation, beacon, probe request, and probe response frames) or other IEEE 802.11 frames that carry control or management information. The minimum sensitivity threshold value may be transmitted using any proprietary or operating system specific methods.

The minimum sensitivity threshold value may be transmitted to other wireless devices via a wired or wireless medium. In an example, the minimum sensitivity threshold value used by each wireless device within an enterprise network may be broadcasted in a wireless signal by that wireless device at maximum transmit power. The wireless device may be periodically transmitted in a wireless signal. In an example, the minimum sensitivity threshold value is transmitted each time the minimum sensitivity threshold value is modified. The minimum sensitivity threshold value may be transmitted in response to an event (such as addition of an access point to an enterprise network or mesh network or addition of a client device).

5. Using the Minimum Sensitivity Threshold Value

In an embodiment, a minimum sensitivity threshold value for a particular wireless device is used to configure other devices (Block 306 of FIG. 3). The minimum sensitivity threshold value for a particular wireless device is received from the particular wireless device in a wired or wireless signal sent directly from the particular wireless device or from another device. In an example, a controller may obtain the minimum sensitivity threshold value used for a particular wireless device and distribute that minimum sensitivity threshold value to other wireless devices within the same network group as the particular wireless device.

In an embodiment, a first minimum sensitivity threshold value used for configuring a first wireless device is used to determine a second minimum sensitivity threshold value for configuring a second wireless device. The second minimum sensitivity threshold value may be determined by copying the first minimum sensitivity threshold value or by using the first minimum sensitivity threshold as an input in an algorithm to compute a second minimum sensitivity threshold that is different than the first minimum sensitivity threshold value. The algorithm may also use, as input, information related to any radio frequency parameters associated with the first wireless device or the second wireless device. In an example, one or more of the client devices $31_1$-$31_m$, associated with the access point 21, copy the minimum sensitivity threshold used for configuring access point 21.

In an embodiment, a minimum sensitivity threshold value used for configuring a first wireless device is used to determine a transmit power for wireless signals transmitted by a second wireless device. The transmit power for wireless signals transmitted by the second wireless device is based on whether or not the wireless signals are targeted for the first wireless device. If the wireless signal (to be transmitted by the second wireless device) is targeted for the first wireless device, then a transmit power is selected such that when the wireless signal reaches the first wireless device, the signal strength is above the minimum sensitivity threshold value. If the wireless signal (to be transmitted by the second wireless device) is not targeted for the first wireless device, then a transmit power is selected such that when the wireless signal reaches the first wireless device, the signal strength is below the minimum sensitivity threshold value.

In one example, a mesh network includes mesh nodes such as a mesh portal, a mesh point, and/or a mesh access point. A first mesh node in the mesh network transmits a wireless signal with an advertisement of the minimum sensitivity threshold value, used for configuring the first mesh node, to neighboring mesh nodes. With the advertisement, the first mesh node includes a transmit power value of the wireless signal when the wireless signal is being transmitted from the first mesh node. A second mesh node determines a signal strength of the wireless signal when the wireless signal is received at the second mesh node from the first mesh node. The second mesh node calculates the loss in power for the wireless signal based on the signal strength of the wireless signal when the wireless signal is received and the transmit power of the wireless signal when the wireless signal was transmitted. The loss in power may be computed by subtracting (a) the signal strength when the wireless signal is received from (b) the transmit power of the wireless signal when the wireless signal was transmitted. The loss in power is due to a distance between the first mesh node and the second mesh node, obstacles such as walls, and/or environmental conditions which affect transmission of wireless signals.

The second mesh node then determines the minimum transmit power for transmitting a wireless signal targeting the first mesh node by adding at least (a) the calculated loss in power for the wireless signal transmitted from the mesh node to the second mesh node and (b) the minimum sensitivity threshold value used by the mesh node. Determining the minimum transmit power may further include adding additional values to account for variations in design parameters and environmental variations. Sending a wireless signal from the second mesh node at this minimum transmit power will result in the first mesh node receiving the wireless signal with a signal strength equivalent to the minimum sensitivity threshold value. This computation assumes that the loss in power for wireless signals sent from the first mesh node to the second mesh node is equivalent to the loss in power for wireless signals sent from the second mesh node to the first mesh node. Since the amount of power loss generally varies slightly for different wireless signals due to varying conditions, an offset may be used to ensure that the first mesh node receives the wireless signal sent by the second mesh node. The offset is created by transmitting wireless signals at a transmit power x dB higher than the total of (a) power loss for wireless signals transmitted from the first mesh node to the second mesh node and (b) the minimum sensitivity threshold value used by the first mesh node. The x dB may be a static value or a dynamic value computed using an algorithm which accepts as input one or more factors related to environmental conditions, policies, SNR requirements for a link, or other suitable values, 6. Dynamically Changing Minimum Sensitivity Threshold Values In an embodiment, a minimum sensitivity threshold value for a first wireless device is dynamically configured. In one example, the first wireless device is configured with a first minimum sensitivity threshold value, for certain time windows, that is based on the minimum used for configuring a second wireless device. Furthermore, the first wireless device is configured with a different second minimum sensitivity threshold value for other time windows. In an embodiment, the second minimum sensitivity threshold value is lower than the first minimum sensitivity threshold value and accordingly, configured to receive a larger portion of wireless signals detected by the first wireless device.

The second minimum sensitivity threshold value may be used for receiving all possible wireless signals, to receive a subset of wireless signals including beacon frames (and possibly frames subsequent to beacon frames) that advertise information associated with other wireless devices, and/or detect other wireless devices. The second minimum sensitivity threshold value may be used periodically, during off-channel scans, or in response to user input.

In an embodiment, a wireless device is configured to automatically switch between two or more different values for a minimum sensitivity threshold value used for receiving wireless signals. The wireless device may automatically switch between different values based on a schedule, a timer, or based on events. In an example, an access point may use a low minimum sensitivity threshold value each time there is a change in network traffic larger than a particular threshold. A change in network traffic may indicate the addition or removal of other access points. Accordingly, in an effort to detect a current set of active access points by receiving wireless signals from all current active access points, a particular wireless device may lower the minimum sensitivity threshold value.

In an example, an access point may use, during certain time periods, a first minimum sensitivity threshold value that is x dBm higher than the average signal strength of wireless signals received from other access points or x dBm higher than the greatest signal strength of any wireless signals received from other access points. The access point may use, during other time periods, a second minimum sensitivity threshold value that results in receiving all detected wireless signals. The access point may use another minimum sensitivity threshold value is x dBm lower than the average signal strength of wireless signals received from other access points or x dBm lower than the lowest signal strength of any wireless signals received from other access points.

7. Example Embodiments

Embodiments are directed to one or more devices that include a hardware processor and that are configured to perform any of the operations described herein and/or recited in any of the claims below.

In an embodiment, a non-transitory computer readable storage medium comprises instructions which, when executed by one or more processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   receiving, by a network device, a first minimum sensitivity threshold value associated with a first wireless device comprising a hardware processor, the first wireless device being configured to receive wireless signals with a signal strength higher than the first minimum sensitivity threshold value;
   determining, by the network device, a second minimum sensitivity threshold value based at least in part on the first minimum sensitivity threshold value associated with the first wireless device;
   transmitting configuration instructions, by the network device, to a second wireless device to configure the second wireless device to receive wireless signals with a signal strength higher than the second minimum sensitivity threshold value.

2. The method of claim 1, wherein the first minimum sensitivity threshold value comprises a first minimum sensitivity threshold value in a wireless signal transmitted by the first wireless device to the second wireless device, wherein the wireless signal includes an advertisement of the first minimum sensitivity threshold value.

3. The method of claim 1, wherein the second minimum sensitivity threshold value is identical to the first minimum sensitivity threshold value.

4. The method of claim 1, wherein the second minimum sensitivity threshold value is different than the first minimum sensitivity threshold value.

5. The method of claim 1,
   wherein transmitting configuration instructions further comprises transmitting configuration instructions to the second wireless device to configure the second wireless device to receive, during periodically occurring time windows or in response to an event, wireless signals with a signal strength higher than a third minimum sensitivity threshold value, wherein the third minimum sensitivity threshold value is lower than the second minimum sensitivity threshold value.

6. A method comprising:
   receiving, by a network device, a first minimum sensitivity threshold value associated with a first wireless device comprising a hardware processor, the first wireless device being configured to receive wireless signals with a signal strength higher than the first minimum sensitivity threshold value;
   based on the first minimum sensitivity threshold value associated with the first wireless device, determining, by the network device, a transmit power for a second wireless device transmitting a particular wireless signal;
   transmitting configuration instructions, by the network device, to configure the second wireless device to transmit the particular wireless signal at the transmit power.

7. The method of claim 6, wherein determining the transmit power comprises determining the transmit power to be of a sufficient level such that when the particular wireless signal reaches the first wireless device from the second wireless device, the particular wireless signal is at a signal strength higher than the first minimum sensitivity threshold value.

8. The method of claim 7, wherein determining the transmit power is based on determining that the particular wireless signal is targeted at least for the first wireless device.

9. The method of claim 6, wherein determining the transmit power comprises determining the transmit power to be a sufficiently low power such that when the particular wireless signal reaches the first wireless device from the second wireless device, the particular wireless signal is at a signal strength lower than the first minimum sensitivity threshold value.

10. The method of claim 9, further comprising determining that the particular wireless signal is not targeted for the first wireless device.

11. A method comprising:
    determining by a particular wireless device:
    (a) a signal strength for one or more wireless signals received by the particular wireless device;
    (b) an interference value correlating to signal noise detected by the particular wireless device;
    dynamically computing a minimum sensitivity threshold value for the particular wireless device based at least on (a) the signal strength and (b) the interference value;
    configuring the particular wireless device to receive wireless signals with a signal strength higher than the dynamically computed minimum sensitivity threshold value.

12. The method of claim 11, wherein dynamically computing the minimum sensitivity threshold value comprises computing the minimum sensitivity threshold value in response to a change in one or more of: (a) average signal strength of wireless signals received over different non-overlapping or partially overlapping time windows or (b) the interference value.

13. The method of claim 11, wherein dynamically computing the minimum sensitivity threshold value comprises periodically or continuously computing the minimum sensitivity threshold value.

14. The method of claim 11, wherein the interference value is determined based on one or more of:
    (a) interference from wireless signals based on IEEE 802.11 standards;
    (b) interference from signals not based on IEEE 802.11 standards; or
    (c) interference from non-wireless signals.

* * * * *